US009740177B2

(12) United States Patent
Feng

(10) Patent No.: US 9,740,177 B2
(45) Date of Patent: Aug. 22, 2017

(54) STANDARD TIME SYNCHRONIZATION METHOD FOR ELECTRONIC DEVICE

(71) Applicant: Shenzhen Great Power Innovation and Technology Enterprise Co., Ltd., Shenzhen (CN)

(72) Inventor: Qixiang Feng, Shenzhen (CN)

( * ) Notice: Subject to any disclaimer, the term of this patent is extended or adjusted under 35 U.S.C. 154(b) by 175 days.

(21) Appl. No.: 14/807,855

(22) Filed: Jul. 23, 2015

(65) Prior Publication Data

US 2017/0023917 A1 Jan. 26, 2017

(51) Int. Cl.
*G06F 15/16* (2006.01)
*G04R 20/04* (2013.01)

(52) U.S. Cl.
CPC .................................... *G04R 20/04* (2013.01)

(58) Field of Classification Search
CPC ...................................................... G04R 20/04
USPC .......................................................... 709/248
See application file for complete search history.

(56) References Cited

U.S. PATENT DOCUMENTS 9,473,983 B1 * 10/2016 Gerdes .................... H04L 27/32
2015/0256874 A1 * 9/2015 Kim ................. H04N 21/42215 725/151
2017/0026088 A1 * 1/2017 Cho ..................... H04B 5/0031

* cited by examiner

*Primary Examiner* — Glenford Madamba
(74) *Attorney, Agent, or Firm* — Novoclaims Patent Services LLC; Mei Lin Wong

(57) ABSTRACT

A method of time synchronization between a timepiece-equipped electronic device and a cell phone or an IPAD, which includes the steps of: (a) utilizing the universal standard time of the cell phone or IPAD by a time synchronization APP to obtain a synchronization time information; (b) modulating an audio frequency carrier signal or time signal from the digital signal of the cell phone or IPAD based on the encoding rules of audio phase-shifting; (c) transmitting the time information in the audio frequency carrier signal to the timepiece-equipped electronic device through audio or data signal transmission channel by utilizing the Bluetooth module or WIFI of the cell phone or IPAD; and (d) receiving and pairing the audio frequency carrier signal, decoding the time information and displaying the time information, which is the synchronized time with the cell phone or IPAD, onto the display of the timepiece-equipped electronic device.

16 Claims, 3 Drawing Sheets

STANDARD TIME SYNCHRONIZATION METHOD FOR ELECTRONIC DEVICE

BACKGROUND OF THE PRESENT INVENTION

Field of Invention

The present invention relates to the standard time synchronization technology for an electronic device, and more particularly to a method and device of standard time synchronization for timepiece equipped electronic device by utilizing the time information of a cellular phone or IPAD.

Description of Related Arts

As we know, the current time information is universal standard time. Universal standard time is received and updated by wireless radio-controlled clock. Radio clock is widely used in our everyday life. In additional to our daily uses such as clocks and watches, it is also used in communications, vehicle transportation, television broadcasting, scientific researches, or even in manufacture industry. The time information on cell phones, IPAD or handheld tablet computers, which are becoming more and more important in our daily lives, utilizes the universal standard time provided by radio clock through the operating system. On the other hand, timepiece equipped household electronic products such as music or media players, automotive electronics, lighting equipment and aromatherapy equipment usually do not have the function of receiving the timepiece information from radio clock. As a result, these timepiece equipped household electronic products fail to display the precise universal standard time or fail to update or autocorrect the time information. As people may need to know the precise time information in many different occasions, this type of electronic products, which cannot provide time synchronization with the universal standard time and the precise time information, fail to meet the needs of people and unnecessary issues or problems may be resulted from inaccurate time information.

SUMMARY OF THE PRESENT INVENTION

An object of the present invention is to solve the above problems and provide a method of time synchronization between a timepiece-equipped electronic device and a cell phone or an IPAD in which only simple and quick operation steps are involved to synchronize the time information of the timepiece-equipped electronic device with the time information of the cell phone or IPAD.

Another object of the present invention is to provide a device for time synchronization between a timepiece-equipped electronic device and a cell phone or an IPAD.

Additional advantages and features of the invention will become apparent from the description which follows, and may be realized by means of the instrumentalities and combinations particular point out in the appended claims.

According to the present invention, the foregoing and other objects and advantages are attained by a method of time synchronization between a timepiece-equipped electronic device and a cell phone or an IPAD, comprising the steps of:

(a) opening a time synchronization APP on a cell phone or IPAD, wherein the time synchronization APP utilizes the universal standard time of the operating system of the cell phone or IPAD to obtain a synchronization time information;

(b) modulating an audio signal through audio phase-shifting and forming an audio frequency carrier signal which is capable of signal transmitting through audio signal transmission channel from a digital signal of the time information of the cell phone or IPAD by the time synchronization APP on the cell phone or IPAD;

(c) transmitting the time information in the audio frequency carrier signal to the timepiece-equipped electronic device through audio signal transmission channel by utilizing the Bluetooth module or WIFI of the cell phone or IPAD (d) receiving and pairing the audio frequency carrier signal from the cell phone or IPAD by the timepiece-equipped electronic device, decoding the time information according to the encoding rules of audio phase-shifting and displaying the time information, which is the synchronized time with the cell phone or IPAD, onto the display of the timepiece-equipped electronic device.

In the step (b), the audio phase shifting refers to a 0°-90° phase shift modulation of the digital signal of the time information of the cell phone or IPAD into the audio signal, and the audio signal is transmitted to the timepiece-equipped electronic device through the audio signal transmission channel of the wireless system of the cell phone or IPAD.

In the step (c), the timepiece-equipped electronic device comprises Bluetooth or WIFI function, timekeeping function and data processing function.

In the step (d), the timepiece-equipped electronic device processes Bluetooth pairing in response to the audio frequency carrier signal stream, then decoding the time information through amplifying, filtering and modulating the audio frequency carrier signal and displaying the time information, which is the synchronized time with the cell phone or IPAD, onto the display of the timepiece-equipped electronic device.

According to another embodiment of the preferred embodiment of the present invention, a method of time synchronization between a timepiece-equipped electronic device and a cell phone or IPAD comprises the steps of:

(e) opening a time synchronization APP on a cell phone or IPAD, wherein the time synchronization APP utilizes the universal standard time of the operating system of the cell phone or IPAD to obtain a synchronization time information;

(f) synchronizing and encoding a digital signal of the time information of the cell phone or IPAD by the time synchronization APP on the cell phone or IPAD to form an encoded time information signal, then the encoded time information signal is transmitted to the timepiece-equipped electronic device through the data signal transmission channel of the Bluetooth module or WIFI of the cell phone or IPAD;

(g) receiving and pairing the encoded time information signal from the cell phone or IPAD by the timepiece-equipped electronic device, decoding the encoded time information signal and displaying the time information, which is the synchronized time with the cell phone or IPAD, onto the display of the timepiece-equipped electronic device.

In the step (f), the timepiece-equipped electronic device comprises Bluetooth or WIFI function, timekeeping function and data processing function.

In the step (g), the timepiece-equipped electronic device processes Bluetooth pairing in response to the encoded time information signal, then decoding the encoded time information through amplifying and filtering the encoded time information signal and displaying the time information, which is the synchronized time with the cell phone or IPAD, onto the display of the timepiece-equipped electronic device.

In another aspect of the present invention, the present invention provides a device which is equipped with a time synchronization system utilizing the method of time synchronization of the present invention, the device comprises a cell phone or IPAD; and a timepiece-equipped electronic device wireless communicating with the cell phone or IPAD, wherein the cell phone or IPAD comprises a Bluetooth module, a WIFI module and a time synchronization APP, wherein the timepiece-equipped electronic device comprises at least a wireless module selected from the group consisting of a Bluetooth module or a WIFI module, a microprocessor and a display, wherein the cell phone or IPAD can process time synchronization such that the time information of the timepiece-equipped electronic device is synchronized with the time information of the cell phone or IPAD.

The timepiece-equipped electronic device includes music player, media player, lighting equipment, sprinkler equipment and automotive electronics. Each of the music player, media player, lighting equipment, sprinkler equipment and automotive electronics comprises a microprocessor, a circuit communicating with the microprocessor which receives and decodes the time information, and a display.

The circuit which receives and decodes the time information includes an audio signal receiving circuit, an amplifying and filtering circuit and a decoding circuit. The audio signal receiving circuit is at least one of a Bluetooth receiving module and a WIFI receiving module.

The present invention is advantageous in that the problem of time synchronization of universal standard time for a timepiece-equipped electronic device is solved. Through the time synchronization APP which is installed on a cell phone or IPAD, the time signal of the cell phone or IPAD can be modulated to an audio frequency carrier signal which is transmissible through Bluetooth or WIFI technology. Through the Bluetooth or WIFI of the cell phone or IPAD, the modulated audio carrier signal can be transmitted to the timepiece-equipped electronic device, thereby the timepiece-equipped electronic device can display a real time information, which is synchronized time information, of the cell phone or IPAD. According, the time information on the timepiece-equipped electronic device can be synchronized with the universal standard time and resolve the issue of time inaccuracy and related issues. The present invention makes use of the most widely used cell phone or IPAD to achieve time synchronization for timepiece-equipped electronic device, and the operation is just the same as other APPs on the cell phone or IPAD, which is simple and quick. Accordingly, its application and prospect of acceptance by users are great.

DETAILED DESCRIPTION OF THE PREFERRED EMBODIMENT

The preferred embodiment of the present invention is further described and includes all combinations and modifications encompassed within the spirit and scope of the followings:

Embodiment 1

Figure 1:
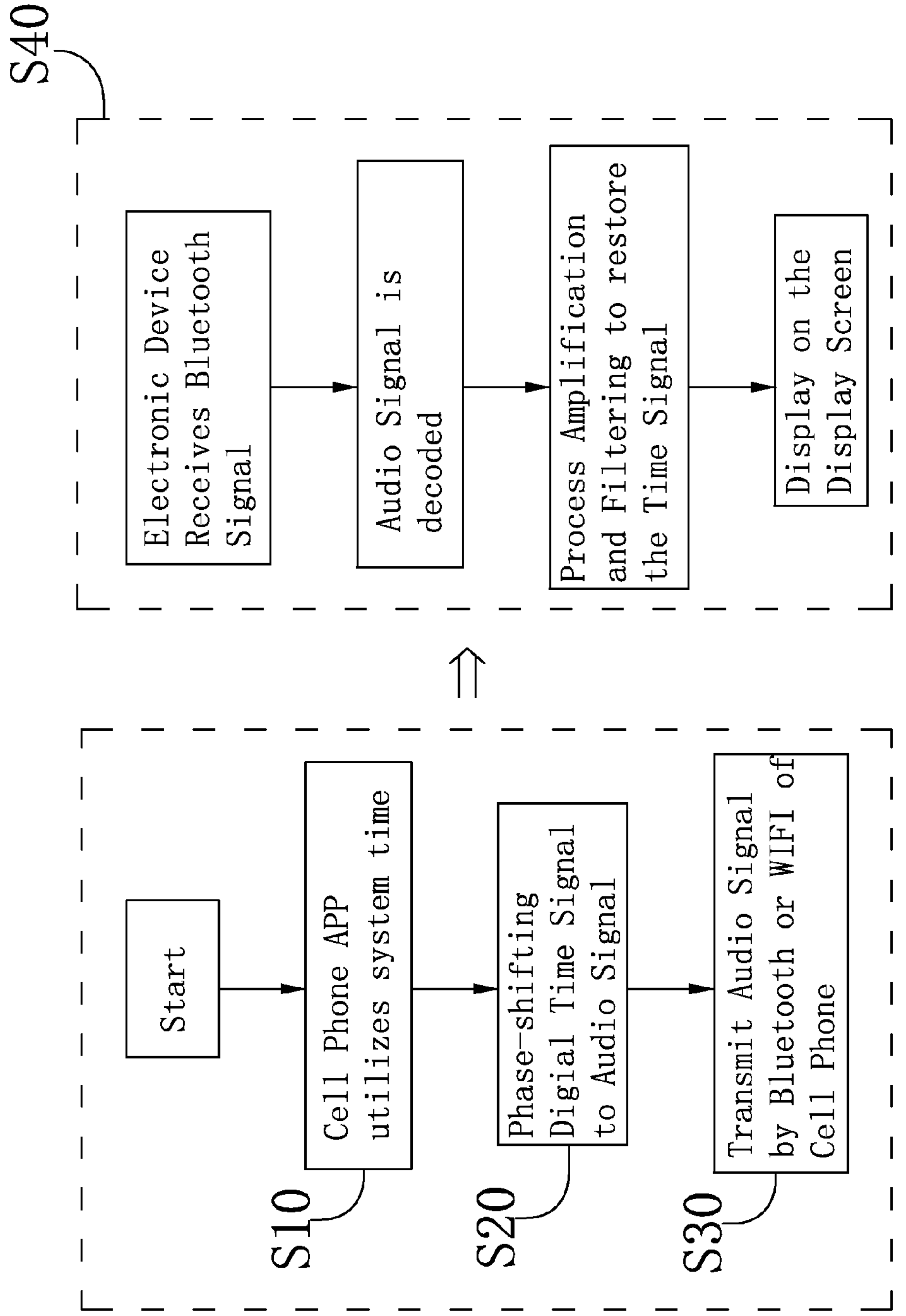
FIG. 1 is the method of time synchronization according to an embodiment 1 of the preferred embodiment of the present invention.

Referring to FIG. 1 of the drawings, the time synchronization of the universal standard time according to the preferred embodiment of the present invention is illustrated. The time information based on the universal standard time from a cell phone or IPAD is synchronized with and transmitted to a timepiece-equipped electronic device. The timepiece-equipped electronic device includes any electronic devices which cannot received the time code of standard time information transmitted from a radio clock and therefore fail to synchronize with the standard time of the radio clock. According to this preferred embodiment of the present invention, a method of time synchronization between a timepiece-equipped electronic device and a cell phone or IPAD comprises the following steps:

According to this preferred embodiment of the present invention, the time synchronization device is preferably a cell phone. As shown in FIG. 1, a time synchronization APP is written into the cell phone, which includes a control program, icons and operation of the APP. In particular, the control program includes an audio phase shifting encoding program and decoding program for a time information, which is the synchronized time information. According to this preferred embodiment, the audio phase shifting encoding program is a binary phase shifting encoding program through which the time encoding signal is modulated into an audio signal for signal transmission. The time synchronization APP is stored in the cell phone 10 inside its memory.

In the step S10, when the timepiece-equipped electronic device is required to initiate an operation for time synchronization process, the icon of the time synchronization APP on the cell phone 10 is selected and open. Since the current time information of the cell phone is a universal standard time received from a radio clock through its communication system, therefore the time synchronization APP utilizes the universal standard time of the cell phone's system directly for time synchronization.

In the step S20, since the current time information from the cell phone cannot be transmitted to the timepiece-equipped electronic device directly, the time synchronization APP in the cell phone 10 is required to process an audio frequency phase shifting such that the time information in digital signal is converted into a transmissible audio signal. The process of audio frequency phase shifting can utilize any conventional program. According to this embodiment, the audio phase shifting refers to a 0°-90° phase shift modulation of the digital signal of the time information of the cell phone into an audio signal. If the current time of the cell phone is 1, the phase-shift is 25°. If the current time of the cell phone is 5, the phase-shift is 70°. Therefore, the digital signal of the time information of the cell phone can be converted into an audio frequency carrier signal and that the audio frequency carrier signal can be transmitted through an audio signal transmission channel of the wireless communication system to the timepiece-equipped electronic device 20.

In the step S30, transmission and operation of the audio frequency carrier signal is carried out on the cell phone. The audio frequency carrier signal which is modulated by step S30 is transmitted to the timepiece-equipped electronic device 20. The timepiece-equipped electronic device 20 is an electronic device which comprises Bluetooth or WIFI function, and timekeeping function and data processing function. The audio frequency carrier signal can be transmitted through the Bluetooth module or WIFI of the cell phone.

According to this embodiment, the modulated audio frequency carrier signal is transmitted by the Bluetooth module of the cell phone 10 through the Bluetooth audio signal transmission channel of wireless transmission system to the timepiece-equipped electronic device 20.

In the step S40, the timepiece-equipped electronic device 20 processes receiving and pairing in response to the modulated audio frequency carrier signal from the cell phone. After the receiving and pairing is successfully processed, the circuit 23 for signal receiving and modulating process for current time synchronization of the timepiece-equipped electronic device 20 processes amplifying, filtering, modulating and decoding process for the received audio frequency carrier signal; and decoding the audio frequency carrier signal according to the encoding rules of audio phase-shifting for time information of the cell phone; then restoring the audio frequency carrier signal into a digital signal of time information, and displaying the time information, which is a synchronized time information, onto the display 22 of the timepiece-equipped electronic device 20.

Embodiment 2

Figure 2:
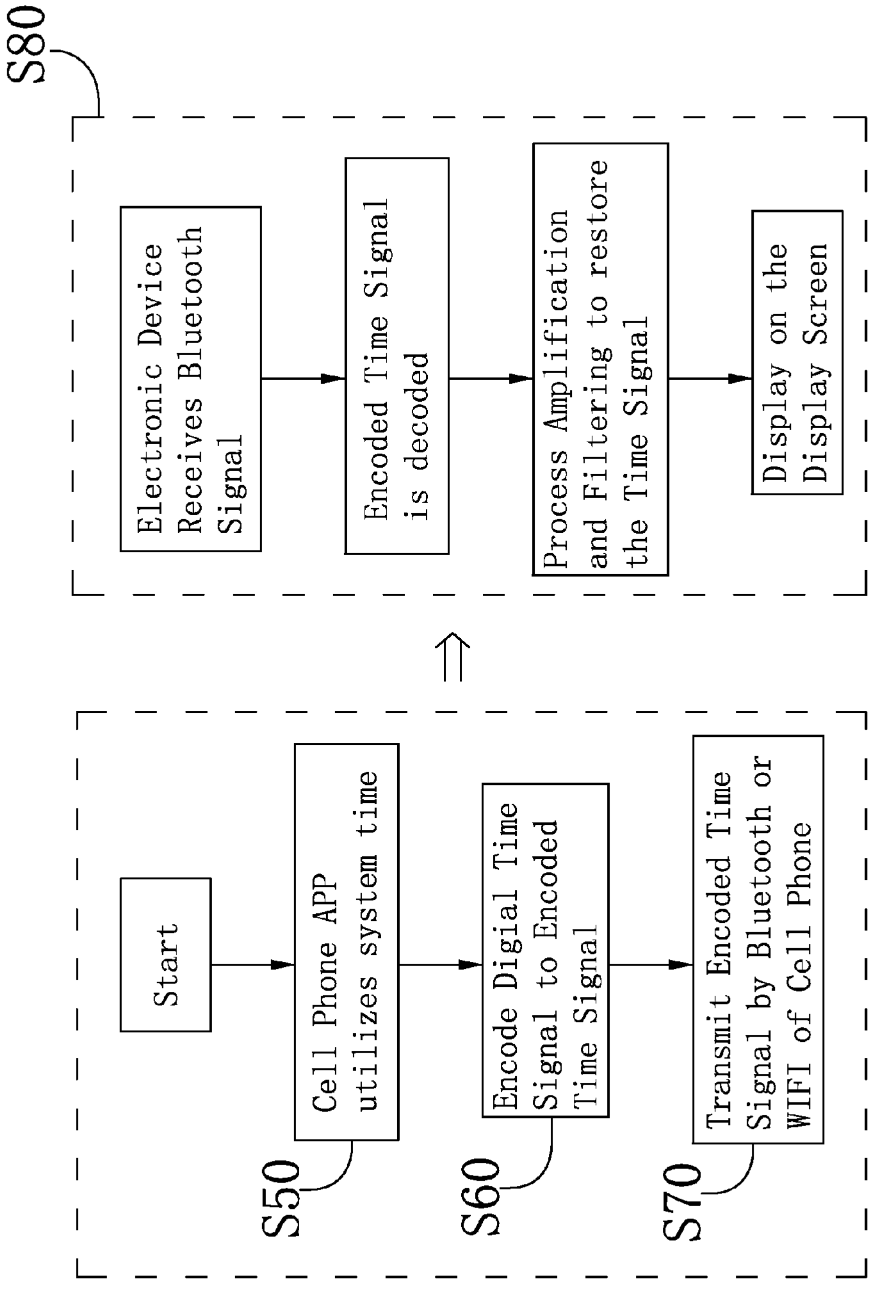
FIG. 2 is the method of time synchronization according to an embodiment 2 of the preferred embodiment of the present invention.

Referring to FIG. 2 of the drawings, according to this preferred embodiment of the present invention, the time synchronization device is preferably a cell phone. The method of time synchronization between a timepiece-equipped electronic device and a cell phone comprises the following steps:

In the step S50, the time synchronization APP on the cell phone 10 is selected and open. The time synchronization APP utilizes the universal standard time of the cell phone's system for time synchronization.

In the step S60, a digital signal of the current time information of the cell phone is encoded by the time synchronization APP to form a time information encoded signal. The time encoding process can utilize any conventional time encoding method.

In the step S70, the time information encoded signal is transmitted to the timepiece-equipped electronic device 20 through the data signal transmission channel of the Bluetooth module of the cell phone. The timepiece-equipped electronic device 20 is an electronic device which comprises Bluetooth or WIFI function, and timekeeping function and data processing function.

In the step S80, the timepiece-equipped electronic device 20 processes receiving and pairing in response to the time information encoded signal from the cell phone, amplifying, filtering, and decoding the received time information signal and restoring the time information signal into a readable time information signal, and displaying the time information, which is a synchronized time information, onto the display 22 of the timepiece-equipped electronic device 20.

Figure 3:
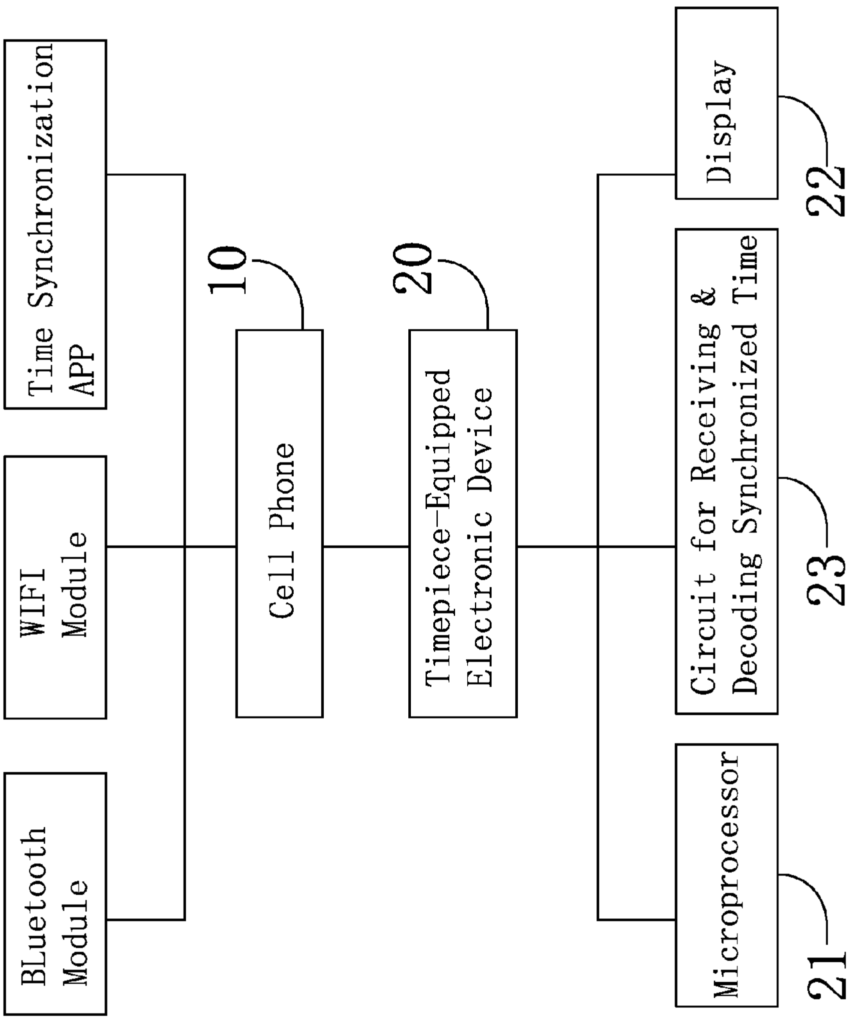
FIG. 3 is the structural block diagram according to the preferred embodiment of the present invention.

The present invention can also be implemented onto a time synchronization device. Referring to FIG. 3 of the drawings, the time synchronization device comprises a cell phone or IPAD 10, and a timepiece-equipped electronic device 20 wireless communicating with the cell phone or IPAD 10, wherein the cell phone or IPAD 10 comprises a Bluetooth module, a WIFI module and a time synchronization APP, wherein the Bluetooth module and the WIFI module is a universal parts in the cell phone or IPAD 10, wherein the time synchronization APP is written with a control program, an icon and an operation program for the APP, which includes an audio phase shifting encoding program and decoding program for a time information. The time information based on the universal standard time from a cell phone or IPAD 10 is synchronized with and transmitted to a timepiece-equipped electronic device 20.

According to this preferred embodiment, the timepiece-equipped electronic device 20 includes a music player, a media player, a lighting equipment, a sprinkler equipment and an automotive electronics. However, the timepiece-equipped electronic device 20 is not limited by the type of electronic device as mentioned above. Each of the music player, media player, lighting equipment, sprinkler equipment and automotive electronics comprises a microprocessor 21, a circuit 23 communicating with the microprocessor 21 which receives and decodes the time information for time synchronization, and a display 22.

The circuit 23 which receives and decodes the time information includes an audio signal receiving circuit 231, an amplifying and filtering circuit 232 and a decoding circuit 233. The audio signal receiving circuit 231 is at least one of a Bluetooth receiving module and a WIFI receiving module. According to the this embodiment, the audio signal receiving circuit 231 is a Bluetooth receiving module arranged for receiving time signal from the cell phone or IPAD. The amplifying and filtering circuit 232 can be any conventional amplifying and filtering circuit. The decoding circuit 233 is a circuit which is complementary to the encoding rules of audio phase-shifting of the cell phone or IPAD.

Accordingly, the present invention, through modulation of the digital signal of standard time in the cell phone or IPAD into an audio signal which is transmissible by the signal transmission channel of the wireless communication system, the current time of the timepiece-equipped electronic device can be synchronized with the universal standard time of the cell phone or IPAD, thereby the time accuracy can be achieved.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of standard time synchronization for a timepiece-equipped electronic device with a cell phone, comprising the steps of:

(a) opening a time synchronization APP on a cell phone, wherein the time synchronization APP utilizes the universal standard time through an operating system of the cell phone to obtain a current time information for synchronization;

(b) modulating to provide an audio signal through an audio phase-shifting process and forming a current time signal in the form of an audio frequency carrier signal which is capable of signal transmission through an audio signal transmission channel from a digital signal of the current time information of the cell phone by the time synchronization APP on the cell phone;

(c) transmitting the current time signal in the form of the audio frequency carrier signal to the timepiece-equipped electronic device through the audio signal transmission channel by utilizing the Bluetooth module or WIFI of the cell phone; and (d) the timepiece-equipped electronic device in response to the current time signal in the form of the audio frequency carrier signal, receiving and pairing the current time signal in the form of the audio frequency carrier signal, then decoding and retrieving the current time signal, and displaying a current time based on the current time signal on a display of the timepiece-equipped electronic device, thereby the current time of the timepiece-equipped electronic device is synchronized with the current time of the cell phone.

2. The method of standard time synchronization for a timepiece-equipped electronic device according to claim 1, wherein in the step (b), the audio phase shifting process comprises the steps of: processing a 0°-90° phase shift modulation of the digital signal of the current time information of the cell phone to produce the audio signal, then transmitting the audio signal to the timepiece-equipped electronic device through the audio signal transmission channel of a wireless transmission system of the cell phone.

3. The method of standard time synchronization for a timepiece-equipped electronic device according to claim 1, wherein in the step (c), the timepiece-equipped electronic device comprises timekeeping function; data processing function; and at least one wireless communication function selected from Bluetooth function and WIFI function.

4. The method of standard time synchronization for a timepiece-equipped electronic device according to claim 1, wherein in the step (d), after the timepiece-equipped electronic device processes receiving and pairing the current time signal in response to the current time signal in the form of the audio frequency carrier signal, the current time signal is decoded and retrieved through amplifying, filtering and modulating the audio frequency carrier signal.

5. The method of standard time synchronization for a timepiece-equipped electronic device according to claim 2, wherein in the step (c), the timepiece-equipped electronic device comprises timekeeping function; data processing function; and at least one wireless communication function selected from Bluetooth function and WIFI function.

6. The method of standard time synchronization for a timepiece-equipped electronic device according to claim 5, wherein in the step (d), after the timepiece-equipped electronic device processes receiving and pairing the current time signal in response to the current time signal in the form of the audio frequency carrier signal, the current time signal is decoded and retrieved through amplifying, filtering and modulating the audio frequency carrier signal.

7. A method of standard time synchronization for a timepiece-equipped electronic device with a cell phone, comprising the steps of:

(e) opening a time synchronization APP on a cell phone, wherein the time synchronization APP utilizes the universal standard time through an operating system of the cell phone to obtain a current time information for synchronization;

(f) encoding a time signal of the current time information from a digital signal of the current time information of the cell phone by the time synchronization APP on the cell phone and transmitting the encoded time signal of the current time information to the timepiece-equipped electronic device through the data signal transmission channel by utilizing the Bluetooth module or WIFI of the cell phone; and (g) the timepiece-equipped electronic device in response to the encoded time signal of the current time information, receiving and pairing the encoded time signal, then decoding and retrieving the time signal, and displaying a current time based on the time signal on a display of the timepiece-equipped electronic device, thereby the current time of the timepiece-equipped electronic device is synchronized with the current time of the cell phone.

8. The method of standard time synchronization for a timepiece-equipped electronic device according to claim 7, wherein in the step (f), the timepiece-equipped electronic device comprises timekeeping function; data processing function; and at least one wireless communication function selected from Bluetooth function and WIFI function.

9. The method of standard time synchronization for a timepiece-equipped electronic device according to claim 7, after the timepiece-equipped electronic device processes receiving and pairing the encoded time signal, the encoded time signal is decoded and retrieved through amplifying, filtering and decoding processing.

10. The method of standard time synchronization for a timepiece-equipped electronic device according to claim 8, after the timepiece-equipped electronic device processes receiving and pairing the encoded time signal, the encoded time signal is decoded and retrieved through amplifying, filtering and decoding processing.

11. A standard time synchronization system utilizing the method of standard time synchronization according to claim 1, said system comprises a cell phone or IPAD; and a timepiece-equipped electronic device wirelessly communicating with the cell phone or IPAD;

wherein the cell phone or IPAD comprises: a Bluetooth module; a WIFI module and a time synchronization APP, wherein the timepiece-equipped electronic device comprises: at least one communication module selected from Bluetooth module and WIFI module; a microprocessor and a display, wherein the current time of the timepiece-equipped electronic device is synchronized with the current time of the cell phone.

12. The standard time synchronization system according to claim 11, the timepiece-equipped electronic device is selected from the group consisting of: a music player, a media player, a lighting equipment, a sprinkler equipment and an automotive electronics, wherein the timepiece-equipped electronic device comprises: a microprocessor, a time synchronization circuit which receives and decodes time information communicating with the microprocessor, and a display.

13. The standard time synchronization system according to claim 12, the time synchronization circuit which receives and decodes time information comprises an audio signal receiving circuit, an amplifying and filtering circuit and a decoding circuit, wherein the audio signal receiving circuit is at least one of a Bluetooth receiving module and a WIFI receiving module.

14. A standard time synchronization system utilizing the method of standard time synchronization according to claim 7, said system comprises a cell phone or IPAD; and a timepiece-equipped electronic device wirelessly communicating with the cell phone or IPAD;

wherein the cell phone or IPAD comprises: a Bluetooth module; a WIFI module and a time synchronization APP, wherein the timepiece-equipped electronic device comprises: at least one communication module selected from Bluetooth module and WIFI module; a microprocessor and a display, wherein the current time of the timepiece-equipped electronic device is synchronized with the current time of the cell phone.

15. The standard time synchronization system according to claim 14, the timepiece-equipped electronic device is selected from the group consisting of: a music player, a media player, a lighting equipment, a sprinkler equipment and an automotive electronics, wherein the timepiece-equipped electronic device comprises: a microprocessor, a time synchronization circuit which receives and decodes time information communicating with the microprocessor, and a display.

16. The standard time synchronization system according to claim 15, the time synchronization circuit which receives and decodes time information comprises an audio signal receiving circuit, an amplifying and filtering circuit and a decoding circuit, wherein the audio signal receiving circuit is at least one of a Bluetooth receiving module and a WIFI receiving module.

* * * * *